United States Patent [19]
Hawes

[11] 3,763,910
[45] Oct. 9, 1973

[54] RESILIENT WHEEL
[76] Inventor: Edward M. Hawes, 32418 Birkshire, St. Clair Shores, Mich. 48082
[22] Filed: Dec. 23, 1971
[21] Appl. No.: 211,589

[52] U.S. Cl.................................. 152/14, 152/92
[51] Int. Cl.................................. B60b 9/06
[58] Field of Search..................... 152/14, 92

[56] References Cited
UNITED STATES PATENTS
1,146,289  7/1915  Shook................................. 152/92
854,655    5/1907  Krell.................................. 152/92
2,403,690  7/1966  Stanley................................ 152/92

Primary Examiner—James B. Marbert
Attorney—Donald P. Bush

[57] ABSTRACT

A wheel in which the load bearing portion adapted to engage the ground is essentially in the form of a multiplicity of spring convolutions. In a preferred form these convolutions form parts of a continuous helically coiled spring bent to extend around the periphery of the central portion of the wheel.

14 Claims, 7 Drawing Figures

PATENTED OCT 9 1973 3,763,910

RESILIENT WHEEL

BRIEF SUMMARY OF THE INVENTION

The present invention relates to a wheel intended generally for use on sand, loose dirt, mud, or other similar terrain.

In its simplest form the invention comprises a wheel having a circular central portion and provided with a tread or ground engaging load supporting surface in the form of a multiplicity of spring convolutions. Conveniently, these spring convolutions may be provided by bending a helically coiled spring around the periphery of the wheel in the position normally occupied by the tire.

Since the spring convolutions at the outer periphery of the wheel are spaced apart they become embedded into the loose material of the terrain which therefore enters into the annular space defined by the complete series of convolutions. In a preferred form of the invention the supporting wheel is provided with a tapered peripheral portion which extends substantially into the annular space defined by the complete series of spring convolutions, the radially inwardly diverging sides serving to guide the material forced into the spring assembly by ground pressure outwardly as the wheel turns, thus tending to keep the interior of the spring or the annular space defined by the spring, substantially clear of ground material.

Preferably, means are provided extending around the spring assembly tending to maintain the adjacent convolutions against individual circumferential displacement so as to maintain the designed spacing therebetween under service conditions. In addition, the convolutions may be designed to define a substantially cylindrical outer surface which in turn establishes a great area of contact with the ground, and further, reduces excessive wear centrally of the spring convolutions.

In some cases it is desirable to cover the outer peripheral envelope defined by the spring convolutions with a relatively coarse screen material, which will contribute to support of the spring structure in sand, soft ground, mud, or the like.

Finally, traction may be increased by providing transversely extending ground engaging cleats.

DETAILED DESCRIPTION

Figure 1:
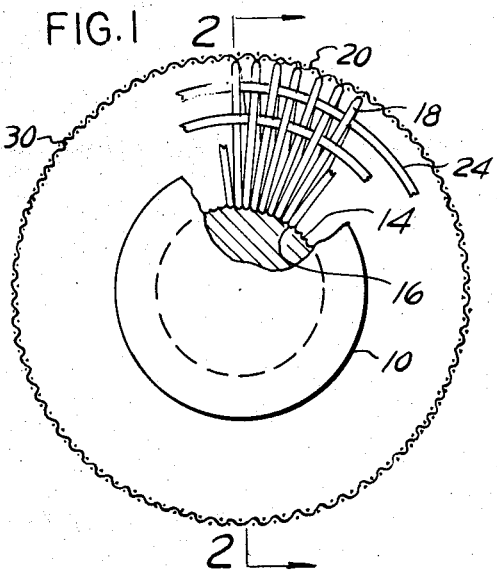
FIG. 1 is a fragmentary more or less diagrammatic elevational view of a wheel assembly constructed in accordance with the present invention.
Figure 2:
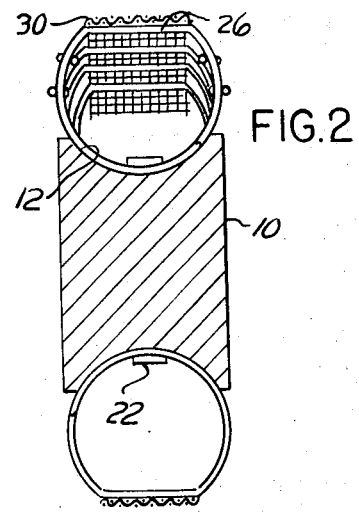
FIG. 2 is a fragmentary sectional view on the line 2—2, FIG. 1.

Referring first to FIGS. 1 and 2, the central portion of the wheel assembly is indicated diagrammatically at 10 as a generally circular block having a peripheral arcuate groove 12 extending therearound. It will of course be understood that in practice the wheel proper will be provided with the usual structure permitting its attachment to rotatable wheel supporting structure, but this forms no part of the present invention and is omitted for the purpose of simplifying the present disclosure.

As previously indicated in FIG. 1 the peripheral annular groove 12 is formed with its surface suitably corrugated as indicated at 14 to receive the inner portions 16 of the individual convolutions 18 of the spring structure. The spring structure initially may be in the form of a helically coiled straight spring in which the adjacent convolutions are somewhat spaced apart. The helical spring then is bent to extend circumferentially around the wheel portion 10 with the result that the inner portions 16 of the convolutions are brought towards each other. As illustrated in FIG. 1, the inner portions 16 of the convolutions may be brought into actually circumferential engagement or alternatively, they may remain slightly spaced apart. In any case, due to the curvature of the coil spring into a circular shape, the outer portions of the spring convolutions as indicated at 20 are moved apart to a separation greater than occurs in the straight helical spring.

Any suitable means may be provided for establishing a permanent connection between the inner convolution portion 16 and the interfitting corrugated surface of the wheel 10. For example, the individual convolutions may be welded or brazed in place. Alternatively, a mechanically engaging mounting ring indicated at 22 may extend around and engage the inner surfaces of the inner convolution portions 16. The ring 22 may have end structure adapted to overlap and to receive camming means effective to tighten the ring so as to press the inner convolutions of the spring into the corrugations 14. The structure illustrated in FIGS. 1 and 2 includes a multiplicity of circumferentially extending rings 24 which as shown are interlaced back and forth between adjacent convolutions, the adjacent rings 24 being disposed at opposite sides of each particular convolution, as best illustrated in FIG. 1. Again, the rings 24 may be permanently attached to the spring convolution in the position shown by suitable means such for example as welding, brazing, or the like.

The individual spring convolutions, as best seen in FIG. 2, are preferably not completely circular, but each includes a radially outer straight portion 26 adapted to have theoretical contact from end to end with the terrain when the structure is employed in supporting a vehicle. It will be appreciated that the complete envelope described by the multiplicity of straight convolution portions 26 is essentially cylindrical.

As best seen in the Figures, the extreme outer periphery of the spring tire assembly is provided with a relatively coarse screen structure 30 which in turn may be attached to the straight convolution portions 26 by suitable means such for example as welding, brazing or the like.

With the structure as above described, it will be apparent that when supporting a vehicle, and particularly a heavy vehicle, on soft terrain such as sand, loose dirt, mud or the like, the resilient wheel is capable of supporting the load, and due to the tying together of adjacent spring convolutions, the load will be distributed over a multiplicity of convolutions without permitting displacement of individual spring convolutions. The amount of penetration of the resilient wheel assembly into the terrain may be controlled by dimensions of the parts, particularly the coarseness of the screen 30 where such screen is provided.

In the simplest possible case the spring convolutions may be completely circular and the tying rings 24 and the screen 30 may be omitted. Alternatively, the tying rings 24 may be provided and the screen 30 omitted, or the screeen 20 may be provided and the tying ring 24 omitted, in which case the screen serves the dual function of controlling penetration and also tying adjacent convolutions together to prevent lateral displacement of individual convolutions.

The resilient wheel structure provided by bending the helically coiled spring into a circular or annular configuration, supported on the periphery of the inner wheel portion, also provides great stability against lateral displacement, particularly when the inner portion of the spring assembly is received in an annular channel of arcuate cross-section, as best illustrated in FIG. 2.

Figure 3:
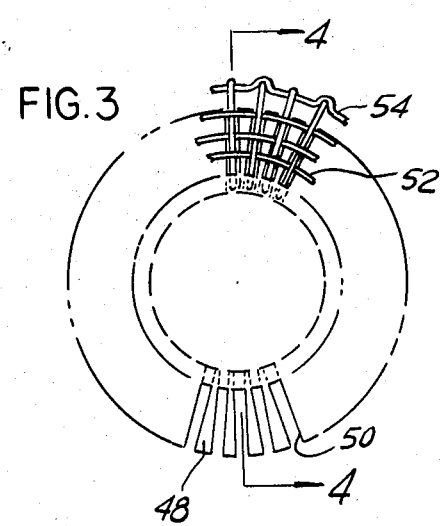
FIG. 3 is a fragmentary elevational view of another embodiment of the invention, with parts broken away.
Figure 4:
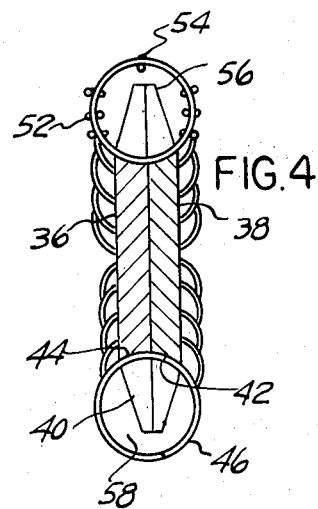
FIG. 4 is a sectional view on the line 4—4, FIG. 3.

Referring now to FIGS. 3 and 4 there is illustrated a further embodiment of the present invention. In this case the inner wheel portion indicated generally at 34, is composed of two circular or preferably annular elements 36 and 38 which are brought together in assembly and united to form a unitary structure. The peripheral portions 40 of the rings 36 and 38 are tapered and are slotted, the bottoms of the slots as indicated at 42 being of arcuate cross-section so as to receive and closely interfit with the inner portions 44 of the spring convolutions 46. With this arrangement the inner convolution portions 46 are fully supported against circumferential movement by the material 48 intermediate and defining the slots 50 which receive the individual spring convolutions. In assembly, the coil spring may be bent into the circular configuration shown and the two wheel portions 36 and 38 assembled by movement toward each other into the position illustrated in FIG. 4. The ends of the helically coiled spring may be united by suitable means such for example as welding, or by reception in a tubular connecting element (not shown).

As best seen in FIG. 4 the slots 50 are radial and are of a uniform width such as to receive the wire of the convolutions of the spring. As a result, the material 48 intermediate adjacent convolutions is tapered and of outwardly increasing circumferential dimension.

As best seen in FIG. 3, the convolutions 46 of the spring may be fully circular although it is also contemplated that they may be straight across their outer peripheral portion in the same manner as the straight portions 26 of the spring shown in FIG. 2. Again, the convolutions are interconnected by rings indicated at 52 which are preferably interleaved intermittently inwardly and outwardly of the convolutions, as best illustrated in FIG. 3. As indicated in these Figures, three rings are provided at each side of the resilient wheel assembly and a single ring 54 is provided centrally of the wheel at its outer periphery.

The construction illustrated in FIGS. 3 and 4 provides the radially outwardly extending tapered wheel portion indicated in its entirety at 56 which extends substantially into the hollow interior of the resilient spring tire support structure. This wheel portion 56 serves to guide material penetrating into the hollow interior 58 of the assembly laterally as the wheel turns so as to provide for expulsion of loose material such as sand or dirt which is forced into the interior 58 by ground pressure as the vehicle moves over the terrain.

While in FIGS. 3 and 4, no screen such as the screen 30 of FIGS. 1 and 2 is illustrated, it will of course be appreciated that if desired screen material of this type may be applied over the outer transversely curved peripheral surface of the resilient wheel assembly.

Figure 5:
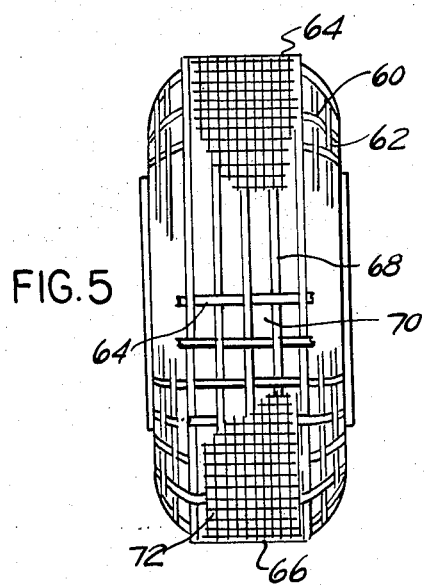
FIG. 5 is a side elevational view of a wheel assembly representing a further embodiment of the present invention.

FIG. 5 is a side elevation of a wheel somewhat similar to that shown in FIG. 2, in which the convolutions of the main wheel supporting structure are indicated at 60 and are interleaved with annular wire rings 62 substantially similar to the rings 52 disclosed in FIG. 3, and the rings 24 disclosed in FIG. 1. In this case the radially outer portion of each convolution is relatively straight as indicated at 64 so as to provide a substantially cylindrical envelope 66, of the general configuration illustrated in FIG. 2. In this case however, the generally flat convolution portions are interlaced with circumferentially extending rings 68 which are provided in over and under relation to define the generally recticulate form best illustrated at 70. In many cases this will be the final condition of the wheel assembly although it is contemplated that if desired a relatively coarse screen as indicated at 72, may be provided to overlie the interlaced spring convolutions, and circular tie rings 68. This will in general be a matter of choice depending upon the terrain for which the resilient wheel is designed.

Figure 6:
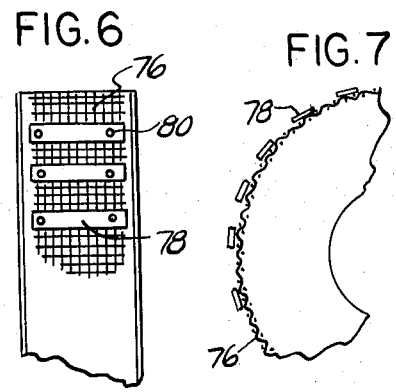
FIG. 6 is a fragmentary elevational view illustrating the application of cleats to the tread structure.
Figure 7:
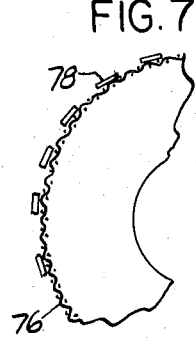
FIG. 7 is a fragmentary end view of the structure shown in FIG. 6.

Referring to FIGS. 6 and 7 there is illustrated a further modification which may be applied generally to any of the wheel previously described. In these Figures the wheels are illustrated as supplied around their outer periphery with the screen material 76 and to provide for increased traction transversely extending cleats 78 are provided with may be attached by any suitable means such for example as rivets or threaded fasteners indicated diagrammatically at 80. While in FIGS. 6 and 7 the transversely extending cleats are indicated as straight and as applied to the cylindrical outer wheel surface such as illustrated in FIGS. 2 and 5, it will be appreciated that the cleats may be arcuately curved if desired and applied to the outer transversely curved surface of the wheel such as the wheel illustrated in FIGS. 3 and 4, particularly when supplied with screen material thereover.

The resilient spring structure provided at the periphery of the wheel assembly is not only effective to support the load and to provide traction, but it is effective to withstand the tangential force applied when the wheels provided with the resilient spring portions at the periphery are driving wheels. This function is enhanced where adjacent convolutions are interconnected by the tie rings illustrated in the several embodiments of the invention.

Conveniently, the springs employed to provide the adjacent spring convolutions may be formed from spring wire of circular cross-section suitably compounded and tempered to produce adequate wear resistance, resilience, and strength to withstand the anticipated loads due to the weight of the vehicle, tangential force applied in driving the wheels, and lateral and other forces applied as a result of turning of the vehicle and/or turning of the wheels relative to the vehicle as in steering.

In all cases, the outer portions of the convolutions provide an annular series of circumferentially spaced generally transversely extending resilient supporting ground engaging elements.

What I claim as my invention is:

1. A resilient vehicle wheel assembly comprising a rigid central wheel portion, and a ground engaging load sustaining drive transmitting resilient portion in the form of a series of circumferentially spaced spring wire convolutions extending around the periphery of the assembly and providing an annular series of circumferentially spaced, generally transversely extending, resiliently supported ground engaging elements.

2. An assembly as defined in claim 1 in which said convolutions are parts of a helically coiled wire spring bent into overall annular shape.

3. An assembly as defined in claim 2 comprising in addition means securing the radially inner portions of each convolution to the outer periphery of the central wheel portion.

4. An assembly as defined in claim 3 in which the periphery of the central wheel portion is slotted to leave radially outwardly extending fingers intermediate the slots, said fingers being shaped to assist in expelling ground material forced into the interior annular space defined by said spring convolutions.

5. An assembly as defined in claim 1 comprising in addition annular means connected to each convolution to form tie supports preventing relative circumferential displacement between adjacent convolutions.

6. An assembly as defined in claim 5 in which said annular means comprises wires connected to the side portions of said convolutions.

7. An assembly as defined in claim 6 in which said wires are disposed in alternate inside and outside relation with the series of spring convolutions.

8. An assembly as defined in claim 7 which comprises in addition a screen tread portion secured around the outer periphery of the assembly.

9. An assembly as defined in claim 5 in which said annular means comprises a screen tread portion secured around the outer periphery of the assembly.

10. An assembly as defined in claim 9 comprising in addition a multiplicity of separate transversely extending cleats secured to the peripheral portion of said assembly outwardly of the screen tread portions.

11. A group engaging vehicle wheel for use on soft loose terrain such as loose sand, soil, and the like comprising a rigid rim, a multiplicity of resilient support elements extending outwardly from both edges of said rim, said elements being curved to present outwardly convex surfaces at both sides of said wheel, and an outer ground engaging tread portion comprising a multiplicity of elongated circumferentially spaced tread elements operatively connected to and supported by said support elements.

12. A wheel as defined in claim 11 wherein the spacing between adjacent tread elements is greater than the width of said tread elements measured in a circumferential direction.

13. A wheel as defined in claim 11 in which said ground engaging tread portion comprises a multiplicity of elongated spaced tread elements extending at an angle to said first mentioned tread elements, and connected thereto to form therewith an open mesh structure having openings through which particulate terrain material may pass.

14. A vehicle wheel assembly for use on soft loose terrain such as sand, soil, and the like comprising a rigid rim, a ground engaging drive transmitting tread portion including a series of circumferentially spaced spring wire elements, and means connecting said tread portion to said rim and resiliently supporting said tread portion in spaced surrounding relation to said rim.

* * * * *